US008339810B2

(12) United States Patent
Ratnaparkhi et al.

(10) Patent No.: US 8,339,810 B2
(45) Date of Patent: Dec. 25, 2012

(54) WIDE INPUT VOLTAGE POWER SUPPLY (75) Inventors: Milind Ratnaparkhi, Dayton, OH (US); Keith Welker, Troy, OH (US)

(73) Assignee: Illinois Tool Works Inc., Glenview, IL (US)

( * ) Notice: Subject to any disclaimer, the term of this patent is extended or adjusted under 35 U.S.C. 154(b) by 363 days.

(21) Appl. No.: 12/723,424

(22) Filed: Mar. 12, 2010

(65) Prior Publication Data
US 2011/0221279 A1 Sep. 15, 2011

(51) Int. Cl.
H02M 3/335 (2006.01)
H02M 7/02 (2006.01)
G05F 1/577 (2006.01)

(52) U.S. Cl. ......... 363/21.01; 363/16; 363/97; 363/126; 323/267

(58) Field of Classification Search ............ 363/16, 363/21.07, 21.15, 95, 97, 125, 126, 20, 21.01, 363/98, 17; 323/267; 307/11, 15, 16, 17
See application file for complete search history.

(56) References Cited

U.S. PATENT DOCUMENTS

| 4,037,271 | A | * | 7/1977 | Keller ......................... 363/21.07 |
| 5,126,930 | A | * | 6/1992 | Ahn .............................. 363/21.05 |
| 5,805,432 | A | * | 9/1998 | Zaitsu et al. ...................... 363/16 |
| 5,824,990 | A | | 10/1998 | Geissler et al. |
| 6,320,773 | B1 | | 11/2001 | Urish et al. |
| 7,362,599 | B2 | * | 4/2008 | Rapeanu ......................... 363/89 |
| 7,461,516 | B2 | | 12/2008 | Leadingham et al. |
| 7,484,689 | B2 | | 2/2009 | Musial et al. |
| 7,629,781 | B2 | * | 12/2009 | Kyono ........................... 323/267 |
| 8,159,842 | B2 | * | 4/2012 | Chen et al. ....................... 363/49 |
| 2003/0165068 | A1 | | 9/2003 | Tomonaga |
| 2005/0184717 | A1 | | 8/2005 | Walters |
| 2009/0121552 | A1 | | 5/2009 | Mann, III et al. |

FOREIGN PATENT DOCUMENTS
WO 2009058680 A1 5/2009

OTHER PUBLICATIONS

STMICROELECTROICS; STW9N150; N-channel 1500V-2.2-8A-to-247; Very High Voltage PowerMESH Power MOSFET; May 2007.
Semiconductor Components Industries; Variable Off Time PWM Controller; Nov. 2007, Rev.3; Publication Order No. NCP1351/D.
International Search Report for application No. PCT/US2011/027613 mailed Jun. 14. 2011.

* cited by examiner

Primary Examiner — Gary L Laxton
(74) Attorney, Agent, or Firm — Fletcher Yoder P.C.

(57) ABSTRACT

A ground power unit having a power supply unit capable of accepting a wide range of AC input voltages and producing one or more DC power signals for powering components of the GPU is disclosed. In one embodiment, the power supply unit includes a rectifier that converts an AC input power to a DC link power. The power supply unit includes a gate driving circuit that has a power MOSFET transistor which, under the control of a PWM controller, produces a switched DC signal. The DC link power and the output of the gate drive circuitry are provided to a transformer, which modulates the signals and produces a first DC output power signal that is load independent and a second DC output power signal that is load dependent.

23 Claims, 8 Drawing Sheets

WIDE INPUT VOLTAGE POWER SUPPLY

BACKGROUND

The present disclosure relates generally to ground support equipment for aircraft and, more specifically, to ground power units for providing electrical power to an aircraft.

In the aviation industry, a wide variety of ground support equipment is available to provide electrical power and conditioned air, among other things, to aircraft. As will be appreciated, many aircraft are capable of generating their own electric power, such as through the use of onboard generators powered by the aircraft engines. However, because the generation of power by the aircraft engines consumes fuel, it is generally desirable to disable such engines when an aircraft will be stationary on the ground for any sustained period.

Because the internal power generation systems of such aircraft depend on the operation of the engines, and because aircraft are rarely configured to directly interface with power ordinarily available at a facility, external ground power units (GPUs) are frequently utilized to supply electric power to components and systems of aircraft when the aircraft engines are not in operation. For instance, GPUs may be advantageously utilized to provide electric power to aircraft parked at airport terminals, in hangers, on runways, or at some other location, which facilitates operation of a number of aviation systems, including communications systems, lighting systems, avionics, air conditioning systems, and the like, while the aircraft engines are powered down. Additionally, the power provided by GPUs may supplement power provided during operation of the engines while an aircraft is on the ground.

As will be appreciated by one skilled in the relevant art, not all aircraft are designed to utilize power having the same characteristics. For instance, some aircraft utilize alternating current (AC) power, while others utilize direct current (DC) power. Further, even if two aircraft use power having the same type of current, the two aircraft may use power having different voltage characteristics from one another. Because conventional GPUs are generally configured to produce a specific output power, it is common to have a separate ground power unit or cart for each aircraft power standard that may be encountered. To further complicate this logistical drawback, power supply units used in certain conventional GPUs for providing control power to one or more components of the GPU are generally limited to accepting a limited input voltage range, power frequency, and/or either single-phase or three-phase power, and may require installing, interchanging, and/or reconfiguring components (e.g., changing transformer taps) in order to be compatible with other input power standards. Thus, depending on the type of aircraft that needs to be powered and the type of power sources that are available, there is currently little alternative but to design, build and operate ground power units specifically designed to accept and provide one type of power or another. However, buying, providing and maintaining GPUs for each power standard is inefficient and increases the costs associated with supporting a variety of aircraft types.

There exists a need, therefore, for an improved ground power unit system that includes a power supply unit capable of supporting a wide range of input frequencies and voltages, and which is able to accommodate the power requirements for a variety of aircraft types.

BRIEF DESCRIPTION

Embodiments of a ground power unit are disclosed for providing power to a grounded vehicle, such as an aircraft. In accordance with certain embodiments, the ground power unit (GPU) accepts a wide range of AC input voltages and is capable of providing a range of DC output voltages to power a load (e.g., an aircraft or other vehicle). The GPU may include a power supply unit that is also capable of accepting a similar wide range of AC input voltages and producing one or more DC power signals for powering components of the GPU. In one embodiment, the power supply unit includes a rectifier that converts an AC input power to a DC link power. The power supply unit includes a gate driving circuit that has a power MOSFET transistor which, under the control of a PWM controller, produces a switched DC signal. The PWM controller may be configured to perform off-time variable control, such that the switching frequency decreases as the load on the GPU decreases, thus achieving greater efficiency, particularly during no load conditions. The DC link power and the output of the gate drive circuitry are provided to a transformer, which modulates the signals and produces a first DC output power signal that is load independent and a second DC output power signal that is load dependent. In one embodiment, the load independent DC power signal may be utilized for powering control logic of the GPU, and the load dependent DC power signal may be utilized for driving one or more switches of power conversion circuitry within the GPU.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed further below, various embodiments of a ground power unit are provided to support a variety of applications, such as providing ground power to aircraft, having different power requirements. For instance, disclosed embodiments of the ground power unit (GPU) may support a wide range of AC input voltages and provide a range of DC output voltages. In one embodiment, the GPU may include a switched rectifier configured to convert an AC input signal to a DC link signal. A high frequency DC-to-DC switching converter then converts the DC link signal to a switched DC signal that simulates a sine wave based upon a duty cycle determined by control circuitry for achieving a desired DC output level. A single-phase transformer modulates and isolates the switched DC signal, which is then rectified to the desired DC output signal using diode rectifiers coupled to the secondary winding of the transformer. In certain embodiments, the GPU may be controlled using a software-based algorithm that controls the AC input parameters independently of the DC voltage parameters. For instance, in one embodiment, the control algorithm measures the AC input signal and determines an appropriate switching pattern for the switched rectifier. The output of the rectifier (e.g., a DC link power) is then measured, and the DC-to-DC switching converter is controlled to operate at a duty cycle that achieves the desired output voltage.

Further, the GPU, in accordance with embodiments disclosed herein, may include a power supply unit that is also capable of accepting a similar wide range of AC input voltages and producing one or more DC power signals for powering components of the GPU. In one embodiment, the power supply unit includes a rectifier that converts an AC input power to a DC link power. The power supply unit includes a gate driving circuit that has a power MOSFET transistor which, under the control of a PWM controller, produces a switched DC signal. The PWM controller may be configured to perform off-time variable control, such that the switching frequency decreases as the load on the GPU decreases, thus achieving greater efficiency, particularly during no load conditions. The DC link power and the output of the gate drive circuitry are provided to a transformer, which modulates the signals and produces a first DC output power signal that is load independent and a second DC output power signal that is load dependent. By way of example only, the load independent DC power signal may be utilized for powering control logic of the GPU, and the load dependent DC power signal may be utilized for driving one or more switches of power conversion circuitry within the GPU.

Figure 1:
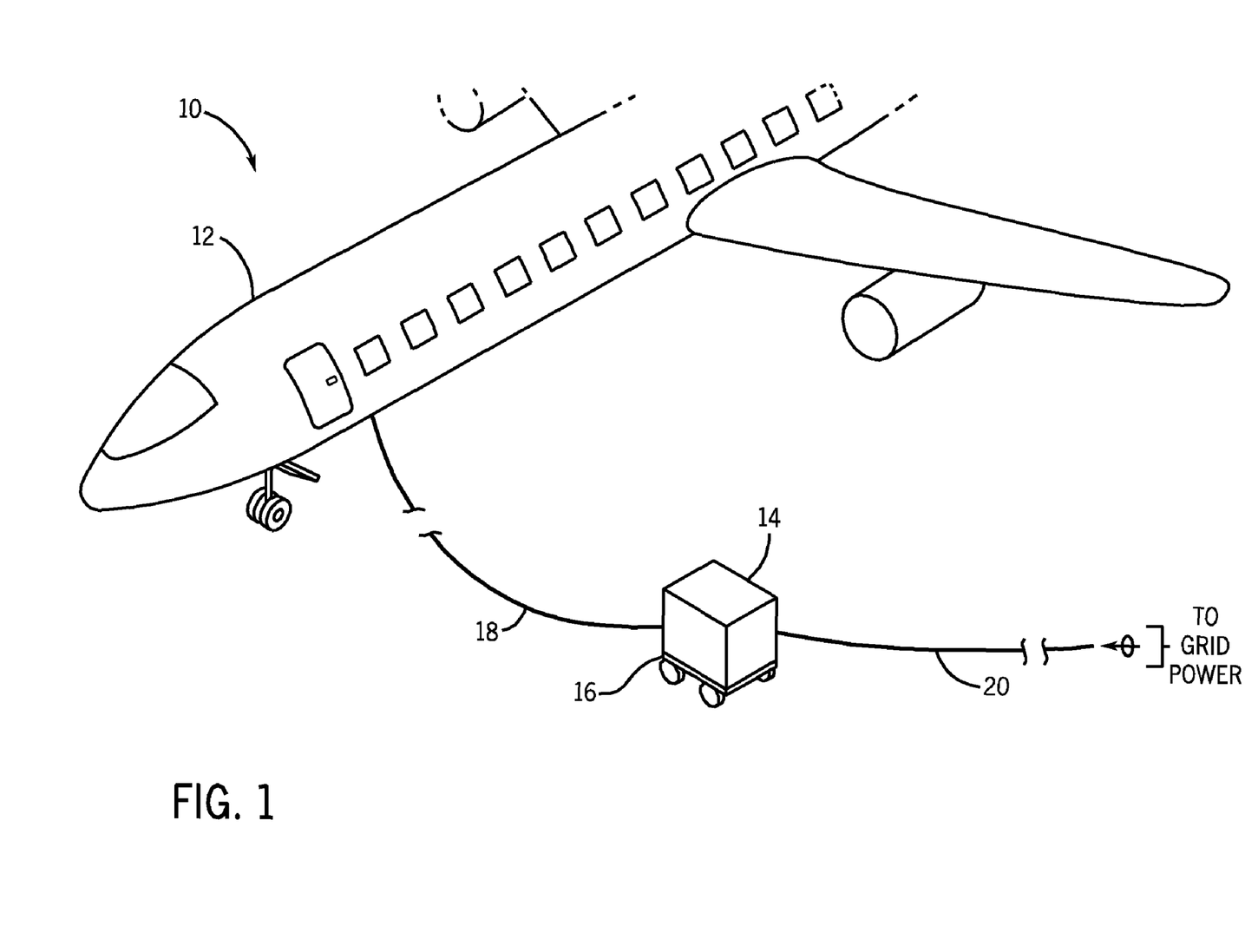
FIG. 1 illustrates a perspective view of an aircraft coupled to a ground power unit, in accordance with one embodiment of the present technique.

Turning now to the drawings, FIG. 1 illustrates a grounded aircraft system 10 that includes a grounded aircraft 12 and a ground power unit (GPU) 14 in accordance with aspects of the present disclosure. As discussed above, the GPU 14 may supply power to the aircraft 12 while the aircraft 12 is grounded. In certain embodiments, the grounded aircraft 12 may be a military aircraft, such as a military jet, helicopter, or carrier airplane, or may be any commercial or private aircraft, such as a commercial aircraft for transporting civilian passengers, or a cargo or freight aircraft.

The system 10 may include a cart 16 for supporting the GPU 14 and facilitating the transport of the GPU 14 from one location to another. The GPU 14 may thus provide output power for powering one or more components of the grounded aircraft 12 by way of the power cable 18. Further, in the embodiment depicted in FIG. 1, power may be supplied to the GPU 14 from an external power source or grid by way of an input power cable 20. In this manner, the aircraft 12 may continue to operate a variety of onboard systems, such as air conditioning systems and electrical systems, without having to generate its own power via onboard generators (e.g., aircraft engines), thereby conserving fuel. Further, in another embodiment, rather than utilizing the cart 16, the GPU 14 may have wheels integrally coupled thereto to facilitate transportation of the GPU 14.

In accordance with embodiments of the present invention, the GPU 14 may be configured to accept a wide range of AC input voltages ($V_{AC}$) and frequencies, and to convert the AC input to a desired DC voltage for supporting a variety of aircraft types. As will be discussed further below, the configuration of the GPU 14 to accept different AC inputs is automatically set by a control algorithm (e.g., does not require manual intervention when a change in input voltage is detected) that senses the AC input and adjusts the switching of certain components (e.g., a rectifier and DC-to-DC converter) automatically. For instance, in one embodiment, the GPU 14 may accept any input voltage between approximately 200 $V_{AC}$ and 600 $V_{AC}$. The GPU 14 may also be configured to accept single-phase or three-phase AC input voltage at line frequencies of 50 or 60 Hz. In one embodiment, the GPU 14 may further be configured to accept a 400 Hz AC input voltage. By way of example only, Table 1 below depicts a range of AC input voltages, as well as frequencies and phases that may be supported by an embodiment of the GPU 14. As indicated in Table 1, the GPU 14 may be configured to accept input voltages between approximately 200 $V_{AC}$ and 600 $V_{AC}$, with a tolerance of 10 percent.

TABLE 1

| Frequency/Phases | Line-to-Line Voltage $V_{RMS}$ |
|---|---|
| 50 hertz, 3-phase | 220 V (+/−10%) |
|  | 380 V (+/−10%) |
| 50 hertz, 1-phase | 220 V (+/−10%) |
|  | 208 V (+/−10%) |
|  | 230 V (+/−10%) |
|  | 460 V (+/−10%) |
|  | 575 V (+/−10%) |
|  | 600 V (+/−10%) |
| 60 hertz, 1-phase | 230 V (+/−10%) |
| 400 hertz, 3-phase | 200 V (+/−10%) |

Further, as will be discussed in more detail below, the GPU 14 may include a power supply unit that is also configured to accept power input signals in accordance with the ranges and frequencies discussed above in Table 1 and to provide one or more control power signals for powering various components within the GPU 14. For instance, in one embodiment, the power supply unit of the GPU 14 may be configured to accept a single-phase or three-phase input power signal having a voltage of between approximately 200 $V_{AC}$ and 600 $V_{AC}$ and convert the input power signal to one or more DC power signals for powering certain components of the GPU 14. By way of example only, the power supply unit of the GPU 14 may supply a first DC power signal to power a control interface of the GPU 14, and may supply a second DC power signal, which may serve as control signals for driving one or more switches of a power converter circuit, such as a DC-to-DC switched converter. In one embodiment, the DC power signal for powering the control interface of the GPU 14 may be approximately 24 $V_{DC}$, and the DC power signal for controlling the switches may be approximately 15 $V_{DC}$.

In one embodiment, the power supply unit, though capable of accepting three-phase power, may tap out two of the three phase waveforms and utilize only a single waveform of the three-phase power for producing the DC power signals. This is because single-phase operation is generally sufficient to derive the required control power without creating significant imbalance in a three-phase input. Thus, in such embodiment, when the power supply unit described herein is referred to as being capable of accepting three-phase power, it should be understood that the power supply unit may receive the three-phase input but is configured to utilize only a single phase.

Figure 2:
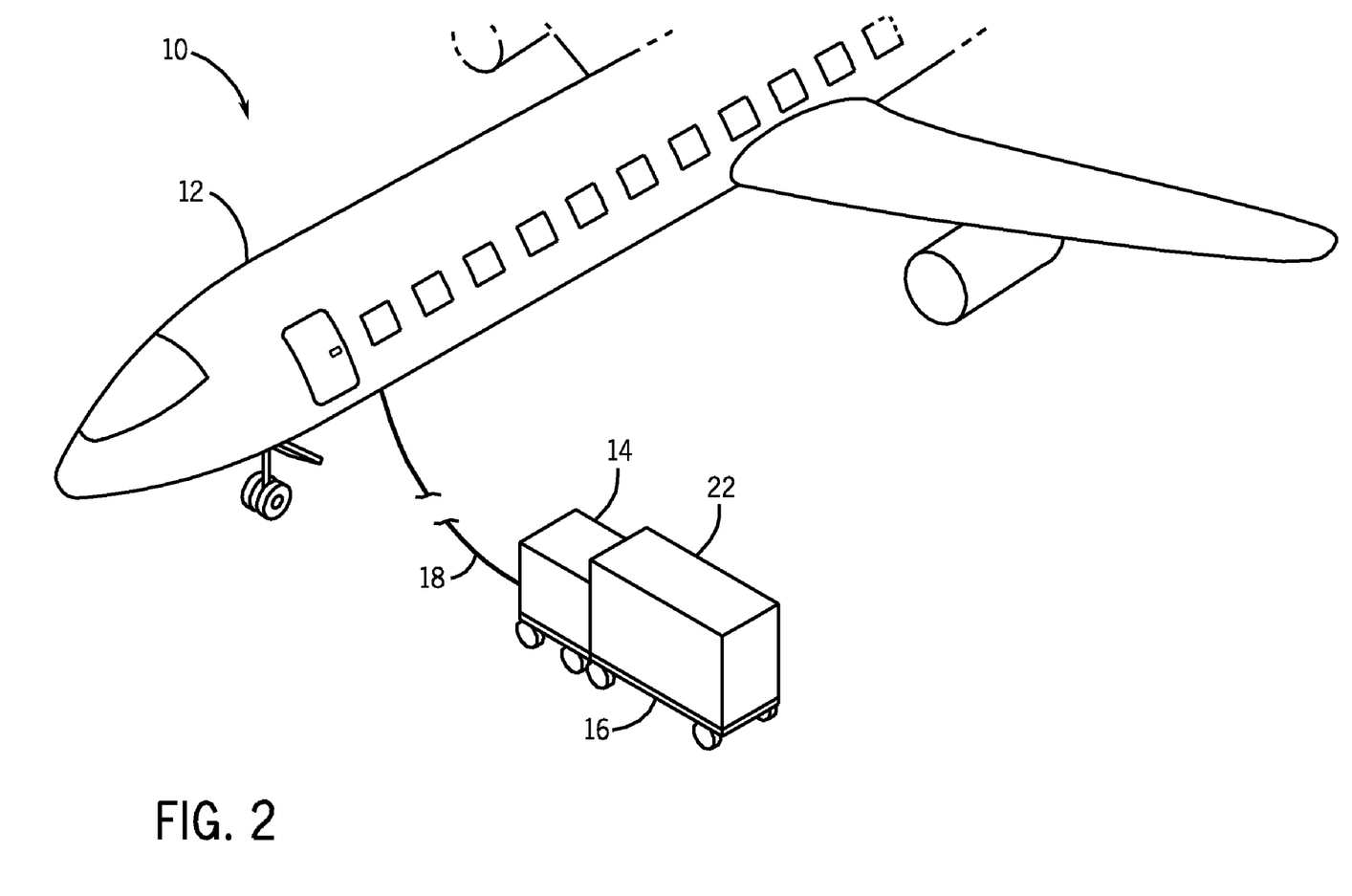
FIG. 2 illustrates a perspective view of an aircraft coupled to a ground power unit, in accordance with another embodiment of the present technique.

FIG. 2 illustrates an alternate embodiment of the system 10, in which the GPU 14, rather than receiving power from a grid, receives power by a combination of an engine and generator 22 (e.g., an engine-generator unit). For instance, the GPU 14 may be electrically coupled to a standalone engine-generator unit 22. The cart 16 may be designed to support both the GPU 14 and the engine-generator 22, or separate respective carts may support each of the GPU 14 and the engine-generator unit 22. As will be appreciated, such a configuration may be particularly well-suited in situations where grid power is not readily available or is not conveniently located in close proximity to the aircraft 12.

Figure 3:
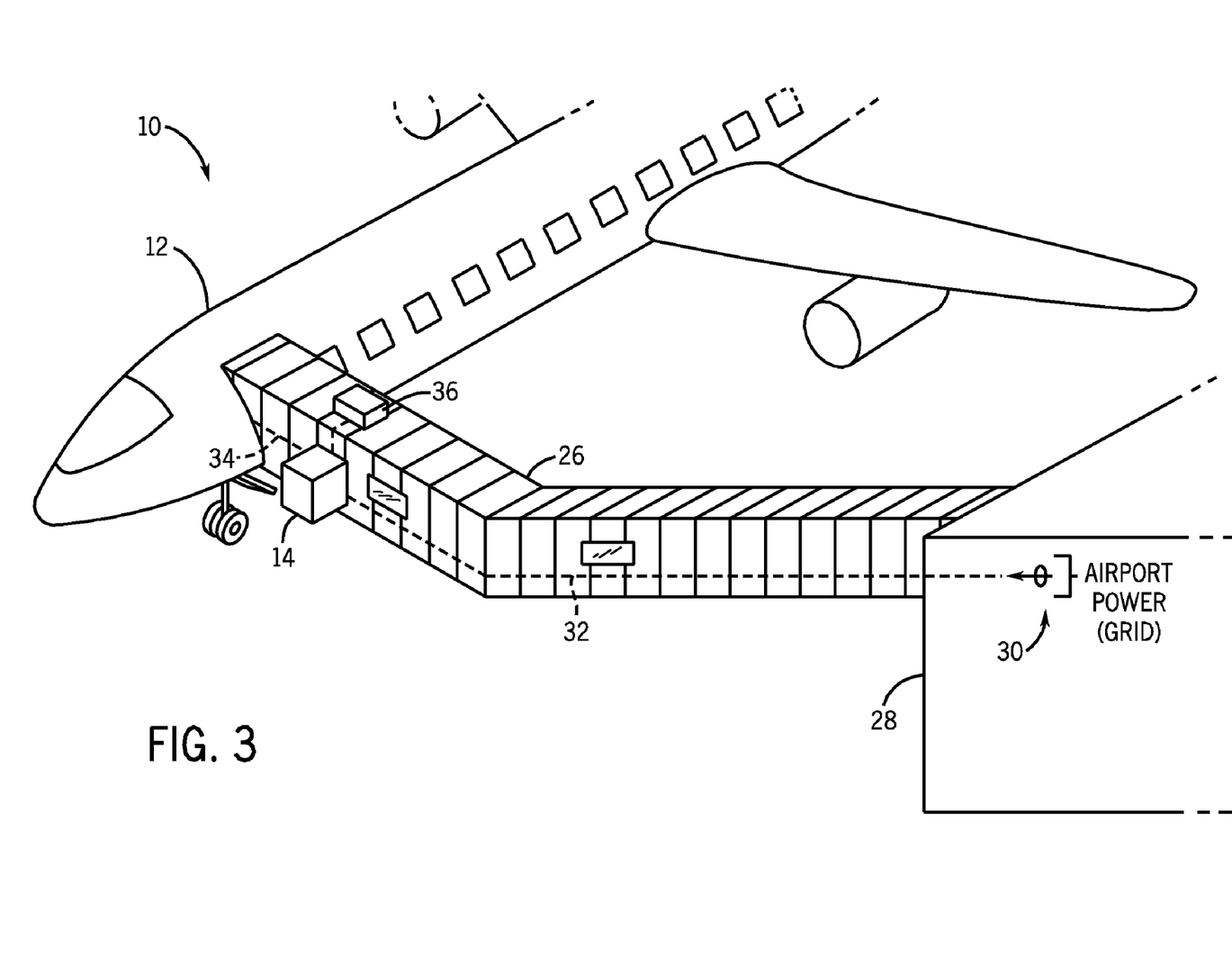
FIG. 3 illustrates a perspective view of an aircraft coupled to a ground power unit that is integrated into a jet bridge, in accordance with a further embodiment of the present technique.

FIG. 3 illustrates a further embodiment of the system 10, in which the GPU 14 is integrated into a jet bridge 26 connected to an airport terminal or gate 28. For instance, as shown in FIG. 3, the GPU 14 may be coupled to an outer wall 30 of the jet bridge 26. In this manner, power may be supplied to the GPU 14 from the airport power source 30 (e.g., grid power) by way of a power cable 32, and the GPU 14 may provide output power to the aircraft by way of a power cable 34. In certain embodiments, the power cables 32 and 34 (shown in phantom in FIG. 3) may be enclosed within the walls of the jet bridge 26 and hidden from the view of passengers entering and exiting the aircraft 12 through the jet bridge 26. As will be appreciated, the configuration of the system 10 shown in FIG. 3 reduces the components (e.g., the GPU 14 and power cables 32, 34) that are present on the ground. Further, the integration of the GPU 14 into the jet bridge 26 ensures that the GPU 14 is available whenever a grounded aircraft 12 is present at the airport gate 28, thus reducing the need to transport a GPU 14 from a remote location to the airport gate 28 each time an aircraft 12 arrives. Referring still to FIG. 3, in an alternate embodiment, the jet bridge 26 may also include a 400 hertz converter 36. In such an embodiment, the GPU 14, instead of receiving power from the airport power source 30, may receive power from the 400 hertz converter 36. Accordingly, the power supply of the GPU 14 may also be configured to receive power from the 400 hertz converter 36 and to convert the received power into one or more DC power signals for powering components (e.g., control circuitry, converter switches, etc.) of the GPU 14.

Figure 4:
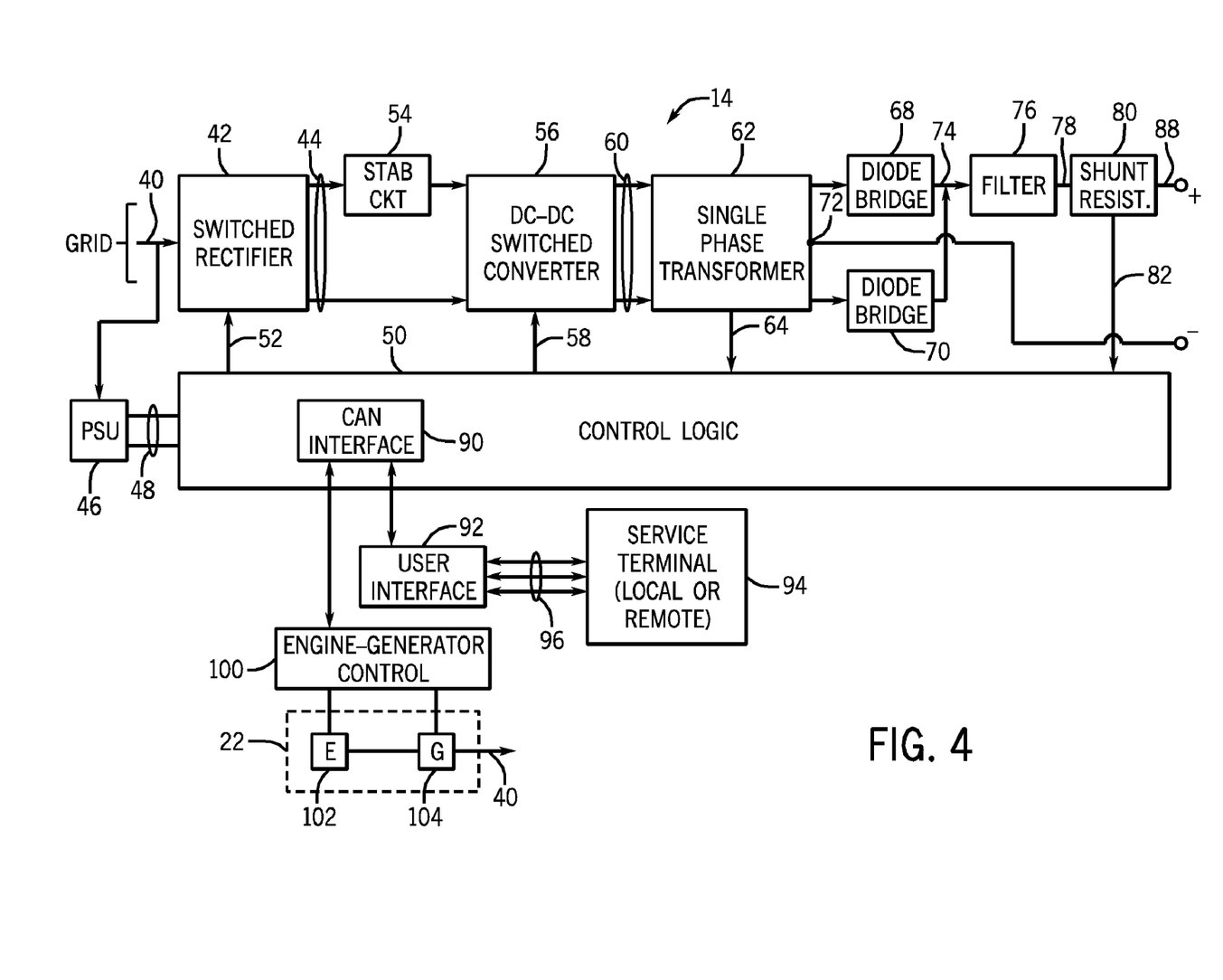
FIG. 4 is a functional block diagram depicting components of a ground power unit having a power supply unit, in accordance with an embodiment of the present technique.
Figure 5:
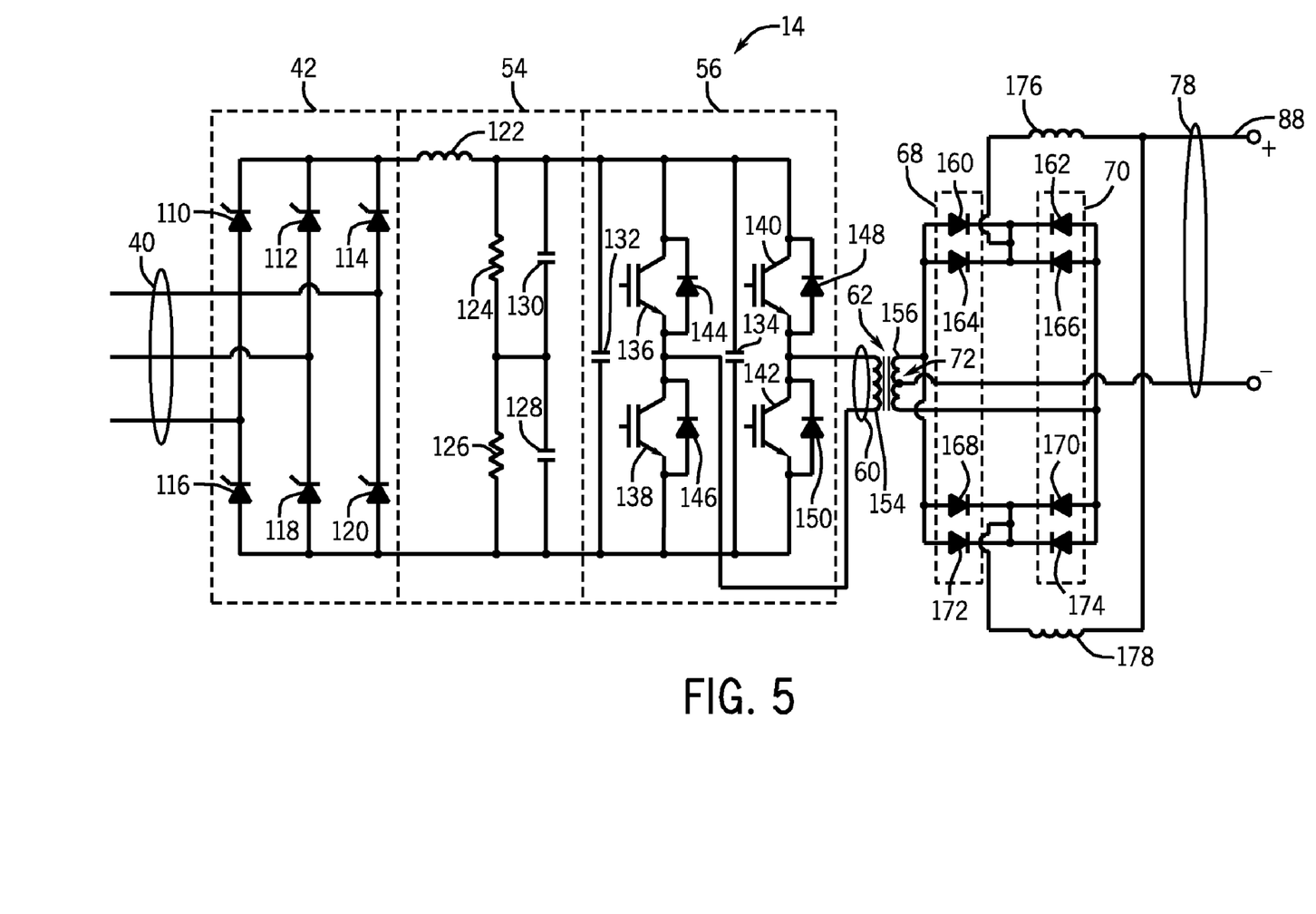
FIG. 5 is a circuit schematic illustrating certain components of the functional block diagram of FIG. 4, in accordance with an embodiment of the present technique.
Figure 6:
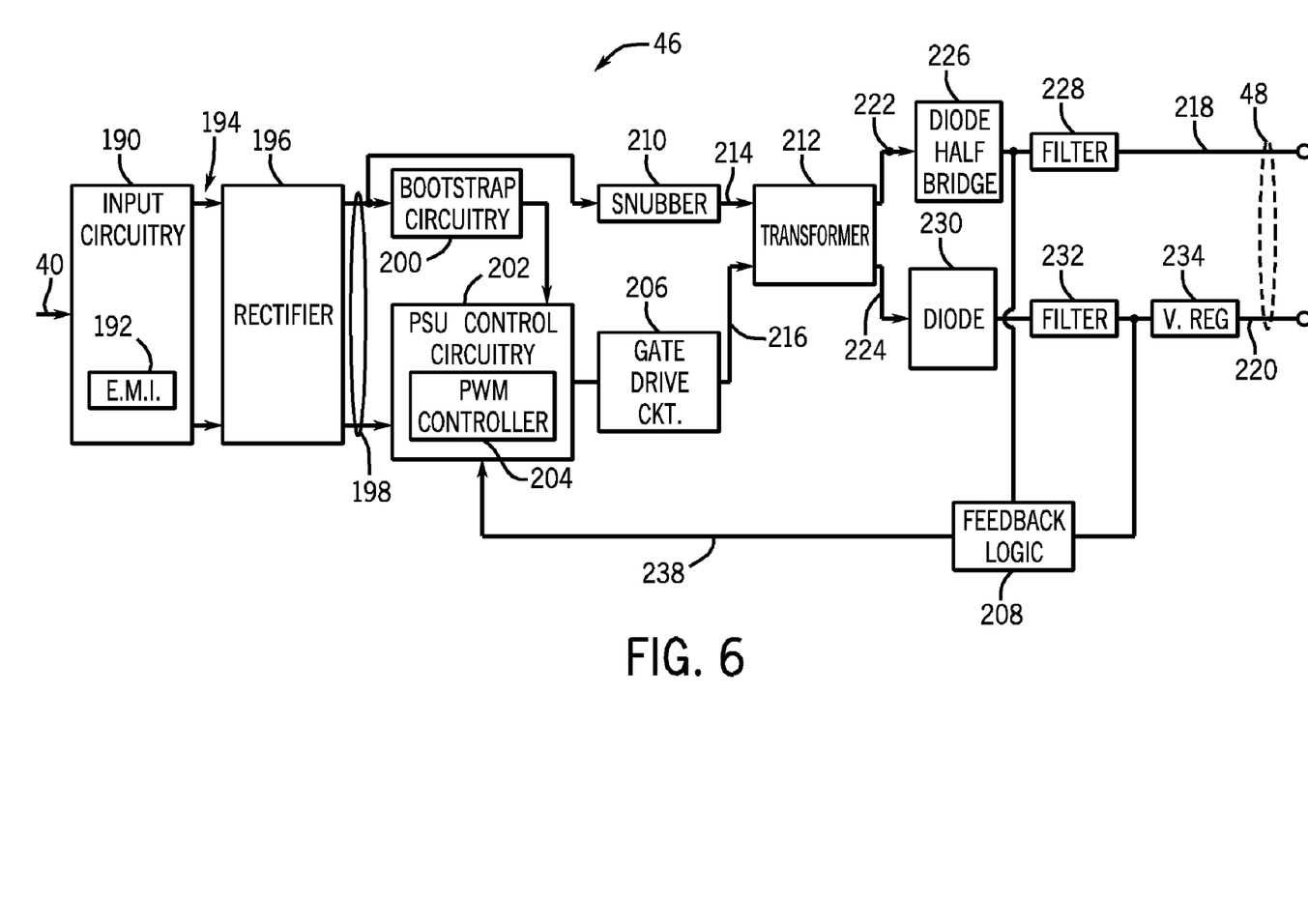
FIG. 6 is a functional block diagram depicting components of the power supply unit shown in FIG. 4, in accordance with an embodiment of the present technique.
Figure 7A:
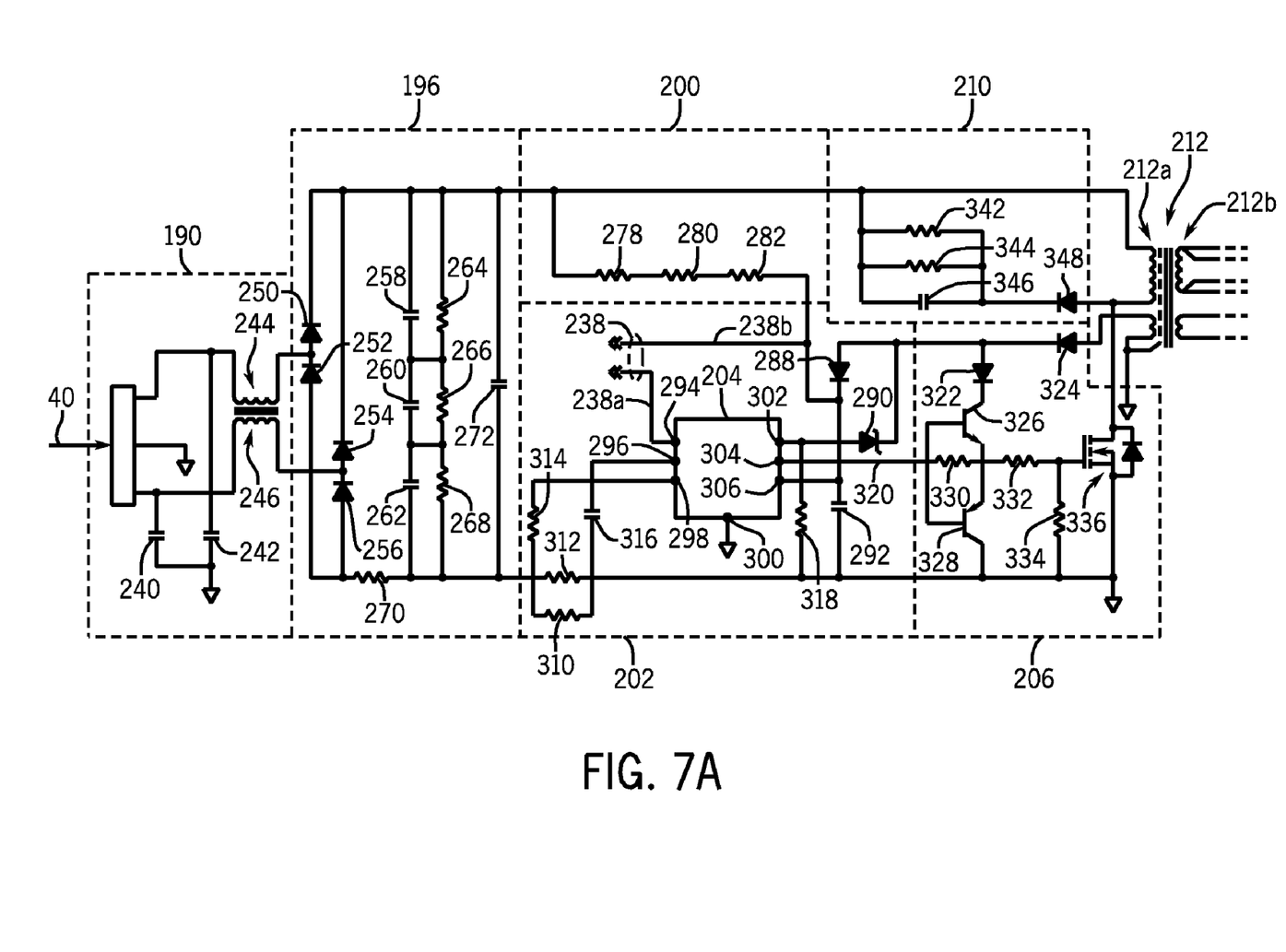
FIGS. 7A and 7B collectively show a circuit schematic illustrating certain components of the functional block diagram of FIG. 6, in accordance with an embodiment of the present technique.
Figure 7B:
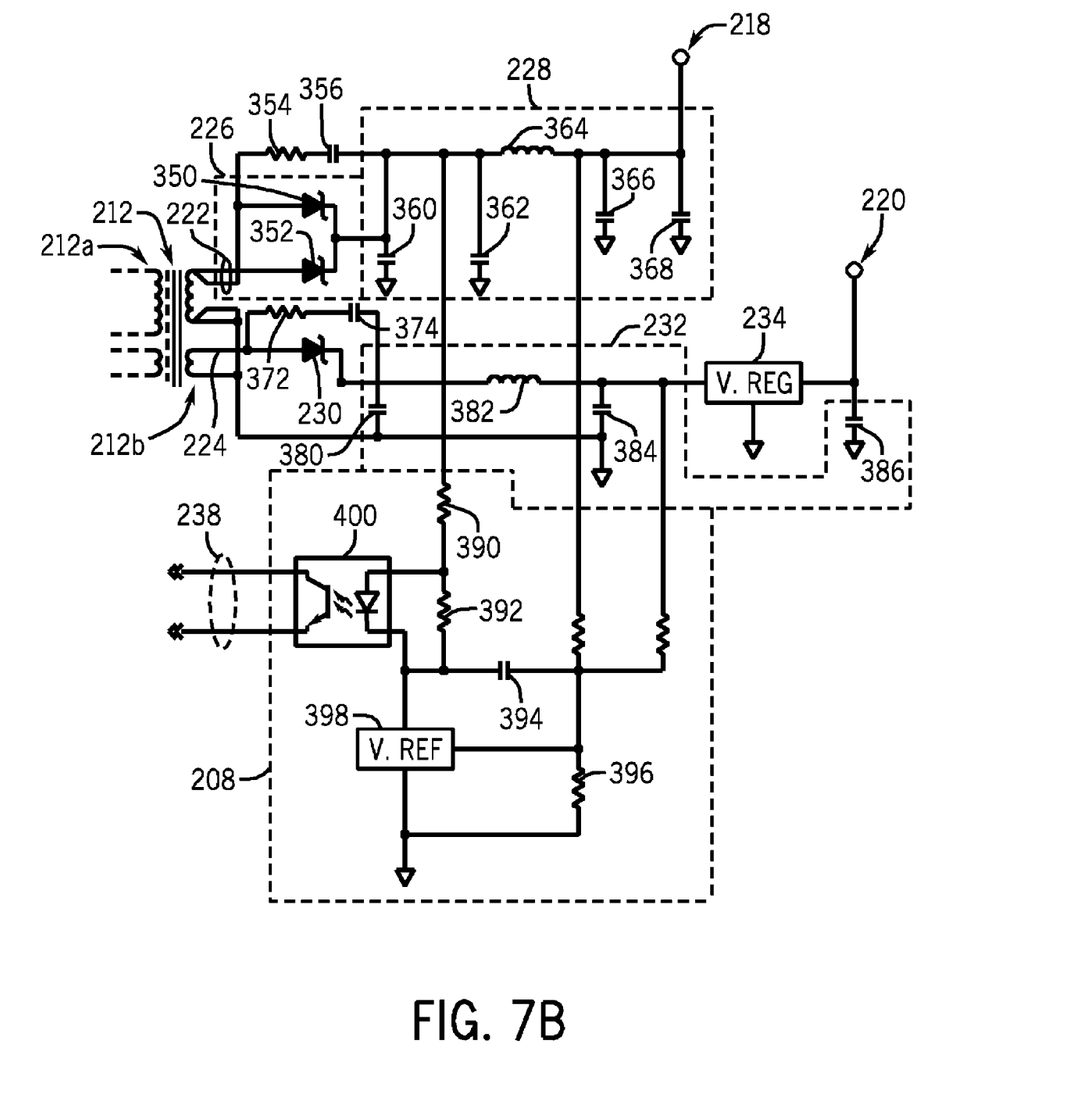

Having introduced the grounded aircraft system 10 in FIGS. 1-3 and generally described several embodiments in which a GPU 14 may provide power to a grounded aircraft 12, the remaining figures are intended to facilitate a better understanding of the GPU 14, as well as explain certain features of its associated power supply unit, in accordance with embodiments of the present disclosure. Particularly, FIG. 4 is intended to depict a simplified functional block diagram of the GPU 14, whereas FIG. 5 is intended to depict a circuit schematic of certain components of the GPU 14. Further, FIG. 6 is intended to depict a simplified functional block diagram of a power supply unit that may be implemented within the GPU 14, and FIGS. 7A and 7B are intended to depict a circuit schematic of certain components of the power supply unit of the GPU 14. Accordingly, FIGS. 4-7B are described below in further detail.

Referring to FIG. 4, a functional block diagram depicting components of an embodiment of the GPU 14 is illustrated. As shown the GPU 14 may receive an AC input power signal 40 from either a grid or an engine-generator unit 22. As discussed above (Table 1), the input power signal 40 may be single-phase or three-phase, and may be between 200 to 600 $V_{AC}$. Additionally, the input power signal 40 may have a frequency of 50, 60, or 400 Hz. A switched rectifier 42 receives the input power signal 40 and rectifies it to a high DC link voltage, referred to herein by reference number 44.

Further, as shown in the illustrated embodiment, the GPU 14 includes a power supply unit 46 which may be configured to receive and convert the AC input power signal 40, which may have a wide range of input voltages (e.g., 200 to 600 $V_{AC}$), into multiple DC signals 48. For instance, in one embodiment, the DC signals 48 may include a 24 $V_{DC}$ signal for powering the control logic 50, and a 15 $V_{DC}$ signal, which may be used to drive the switching devices in the DC-to-DC switched converter 56, as will be discussed further below. The power supply unit 46 will be described in more detail below with reference to FIGS. 6, 7A, and 7B.

The switched rectifier 42 may include one or more solid-state semiconductor switching devices, such as silicon controller rectifiers, thyristors, diodes, and so forth. The switching of the rectifier 42 may be controlled via control signals 52 determined by control logic 50. For instance, in one embodiment, the rectifier 42, under the control of the signals 52, may produce a DC link voltage 44 that is approximately 1.34 times the $V_{RMS}$ of the AC input voltage. The DC link voltage 44 is then received by stabilization circuitry 54 which may be configured to provide power factor and/or harmonic improvements to the DC link voltage signal 44. Depending on the AC input voltage, the rectified DC link voltage may be a high level DC voltage, such as between approximately 600 to 900 $V_{DC}$.

Next, the DC link voltage 44 is then brought down to a lower level voltage by the DC-to-DC switched converter 56. As will be discussed further below, the DC-to-DC switched converter 56 may be implemented in one embodiment as a full bridge converter, which may include insulated-gate bipolar transistors (IGBTs) configured in an H-bridge arrangement. The duty cycle of the converter 56 may be modulated using a control algorithm executed by the control logic 50. For instance, as shown in FIG. 3, the control logic 50 may measure the DC link voltage 44 and output the control signals 58 to the converter 52 to control switching of the transistors, and thus the duty cycle of the converter 52, to achieve a desired output voltage level. In this manner, the controls needed for generating the desired DC levels are independent of the AC inputs. As will be appreciated, this effectively provides a DC supply voltage that is independent of the AC input. The converter 56 may utilize high speed switching frequencies of between approximately 10 kHz to 20 kHz, and may output DC square wave pulse signals 60 that simulate a sine wave. In one embodiment, the converter 56 may operate at a generally constant 20 kHz switching frequency to reduce or substantially eliminate noise. By utilizing this high switching frequency, the GPU 14 is able to accept 400 Hz AC inputs directly. The converter 56 may also utilize a zero voltage switching technique, such that the pulse width is modulated only when required by the output load (e.g., on the output terminal 88 side). By utilizing zero voltage switching, voltage spikes, switching losses, heat, and electromagnetic interference (EMI) may be reduced.

The DC output signal 60 of the converter 56 drives a primary winding of a single-phase transformer 62, which drops the switched DC voltage signal 60 to a desired output level. The secondary pulse of the transformer 62 is center tapped (e.g., grounded), as indicated by reference number 72, to provide a floating reference point for the DC output. Further, as shown in the presently illustrated embodiment, the current across the transformer 62 is provided to the control logic 50, as indicated by reference number 64, where it is used for controlling the switching of the IGBTs in the converter 56 via diode conduction. As will be appreciated, the use of a single phase transformer 62, as shown in FIG. 4, replaces larger and bulkier multi-phase transformers commonly used in conventional ground power units. Thus, the GPU 14 may exhibit substantial weight and/or size reduction and less complex components compared to certain conventional GPU devices. By way of example, in some embodiments, the GPU 14 may exhibit a weight reduction of between 250 to 750 pounds when compared to certain conventional GPU devices.

The positive and negative outputs of the secondary winding of the transformer 62 are then rectified by the diode bridgess 68 and 70, respectively, to produce the desired DC output. As depicted, the diode bridgess 68 and 70 may be arranged in a parallel configuration to accommodate large startup currents. The rectified DC output 74 from the diode bridgess 68 and 70 is further stabilized by filtering circuitry 76. For instance, the filtering circuitry 76 may filter and reduce current ripple and/or voltage ripple in the rectified DC signal 74. A shunt resistor 80 is coupled in the path of the filter DC output 78, and typically has a very low resistance (e.g., milliohms). The shunt resistor 80 functions to supply a current feedback 82 to the control logic 50 for control and safety purposes without noticeably affecting the DC output 78. The DC output 78 is then supplied to the output terminals 88, whereby it may be transmitted via a power cable (e.g., 18 in FIG. 1 and 2, or 34 in FIG. 3) to a load (e.g., aircraft 12). In certain applications, such as for powering grounded aircrafts (e.g., 12), the GPU 14 may be configured to provide a DC output voltage of 28 $V_{DC}$. However, in accordance with disclosed embodiments, the GPU 14 may be capable of providing anywhere from between approximately 14 to 56 $V_{DC}$. As discussed above, the desired DC output voltage may be modulated by adjusting the duty cycle of the converter 56.

The control logic 50 may include one or more processors, such as a microprocessor, ASIC, or FPGA configured to execute a control algorithm. By way of example, the control algorithm may be provided as machine-readable encoded instructions stored on a machine-readable medium, such as memory, a hard-drive, an optical storage device, an EEPROM, a flash memory device, or the like. The control algorithm may provide the control signals 52 and 58 for controlling the switching of the rectifier 42 and the converter 56, respectively, as mentioned above. For instance, in one embodiment, the control algorithm measures the AC input voltage (signal 40), and computes the desired switching sequence (e.g., an SCR firing sequence) for the rectifier 42 to achieve the desired DC link voltage 44. The control algorithm also measures the resulting DC link voltage 44 and computes the duty cycle needed to achieve the desired DC output voltage 78. Thus, the DC output of the GPU 14 is driven by controlling the duty cycle of the converter 56 independently of the AC input voltage.

The control algorithm executed by the control logic 50 may also adjust the DC output voltage 78 for line drop compensation. In this manner, the various levels of compatible AC inputs (e.g., Table 1) and DC outputs (e.g., 14 to 56 $V_{DC}$) are maintained by the software control algorithm. Further, the disclosed GPU 14 may provide for automatic realignment of variable power inputs by adjusting the rectifier switching sequence (e.g., control signals 52) and/or the converter duty cycle (e.g., control signals 58). As such, the disclosed GPU 14 may support a number of applications having different power requirements without requiring the maintenance and upkeep of separate GPUs for different power standards.

As mentioned above, the power supply unit 46 may be configured to provide one or more DC power signals 48 for powering the control logic 50 as well as for driving the switches of the converter 56. That is, the power supply unit 46 may be capable of accepting the same input power signals (e.g., Table 1) as the GPU 14 and providing the appropriate outputs 48 to drive the control logic 50 and the converter 56. For instance, in one embodiment, the DC signals 48 provided by the power supply unit 46 may include a 24 $V_{DC}$ signal for powering the control logic 50, and a 15 $V_{DC}$ signal for driving the switches of the converter 56.

As further shown in FIG. 4, the control logic 50 may include a controller area network (CAN) protocol interface 90, enabling the control logic 50 to communicate with the user interface board 92. The user interface board 92 may provide additional commands, such as start, stop, reset, or manual stop (e-stop) commands that may be initiated or called by an operator. For instance, the operator may operate a service terminal 94, which may be located locally or remotely with respect to the GPU 14, and may include an LCD or VFD display panel. The display panel may display current operating parameters, which may be edited or adjusted by an operator. In one embodiment, the display panel may display a graphical user interface. The service terminal 94 may communicate with the user interface board 92 via several interfaces, including universal serial bus (USB), Ethernet, or by the Recommended Standard 232 (RS-232) protocol, as represented by reference number 96. For instance, local service terminals 94 may communicate with the user interface board 92 by RS-232 or USB interfaces, whereas remote service terminals 94 communicate with the user interface board 92 by wired or wireless Ethernet connections.

Further, in a configuration where the AC input power 40 is provided by the engine-generator unit 22 (e.g., system 10 of FIG. 2), the CAN interface 90 may also provide for communication between the control logic 50 and an engine-generator controller 100. In such a configuration, an operator may also control one or more operating parameters of an engine 102 and/or a generator 104 of the engine-generator unit 22 from the service terminal 94. Additionally, in some embodiments, the control logic 50 may include a flash memory card or some other type of storage device for storing operation data (e.g., statistics), fault and/or failure data, and so forth.

FIG. 5 shows a circuit schematic that depicts certain functional components of the GPU 14 illustrated in FIG. 4 in more detail. For instance, as shown in FIG. 5, the switched rectifier 42 may be an SCR bridge rectifier that includes the SCRs 110, 112, 114, 116, 118, 120, as arranged in FIG. 5. As discussed above, the SCRs 110-120 may rectify a single-phase or three-phase AC input signal 40 to a DC link voltage 44. The stabilization circuitry 54 receives the DC link voltage 44 and provides power factor and/or harmonic improvements. As shown in FIG. 5, the stabilization circuitry 54 may include the inductor 122, resistors 124 and 126, and capacitors 128 and 130. The inductor 122 may be configured to provide power factor and/or harmonic improvements. Further, the capacitors 128 and 130 are configured to maintain the high level DC link voltage output from the SCR bridge rectifier 42. The resistors 124 and 126 are arranged to balance an even voltage across each of the capacitors 128 and 130.

The DC-to-DC converter 56, as shown in FIG. 5, includes the capacitors 132 and 134, a first set of IGBTs 136 and 138 coupled to the negative side of the primary winding 154 of the transformer 62, and a second set of IGBTs 140 and 142 coupled to the positive side of the primary winding 154. As shown, the IGBTs 136, 138, 140, and 142 are configured in an H-bridge arrangement and are coupled to the diodes 144, 146, 148, and 150, respectively. As discussed above, the switching of the IGBTs 136-142 may be controlled by the control logic 50 based upon the DC link voltage 44 to achieve a duty cycle that produces a desired output voltage. For instance, on the first half of a cycle, the IGBTs 136 and 142 may be switched on, and on the second half of the cycle, the IGBTs 138 and 140 may be switched on. This results in a switched DC square wave signal 60 that simulates a sine wave.

The switched DC output 60 of the IGBT H-bridge converter 56 is provided to the primary winding 154 of the transformer 62. The secondary winding 156 is centered tapped 72 (e.g., grounded) to providing a floating reference point for the DC output. As discussed above, the secondary winding 156 provides the DC switched signal 60 to the diode bridgess 68 and 70, which rectify the switched DC signal 60 to produce the desired DC output 78. For instance, the diode bridges 68 may include the diodes 160, 164, 168, and 172, and the diode bridge 70 may include the diodes 162, 166, 170, and 174, configured as shown in FIG. 5. The output of diode bridges 68 and 70 may be filtered by /the inductors 176 and 178, respectively, to produce the DC output signal 78 that is provided to the output terminals 88 which may be coupled to a power cable for delivering the DC output to a load, such as an aircraft (e.g., 12). That is, the inductors 176 and 178 may make up part of the filtering circuitry 76 of FIG. 4. Further, while only the inductors 176 and 178 are shown in FIG. 5, it should be appreciated that in other embodiments, the filtering circuitry 76 may also include capacitors, as well as a combination of capacitor and inductors.

Referring now to FIG. 6, a functional block diagram depicting components of the power supply unit 46 shown in FIG. 4 is illustrated, in accordance with one embodiment. As shown, the power supply unit 46 includes input circuitry 190 configured to receive the AC input power signal 40. As discussed above, the power supply unit 46 may be configured to accept a relatively wide range of input voltages, such between approximately 200 to 600 $V_{AC}$, as shown in Table 1. The power supply unit 46 may also accept inputs having a frequency of 50, 60, or 400 Hz. Further, as mentioned above, the power supply unit 46 may accept three-phase or single-phase power but, in certain embodiments, when accepting three-phase inputs, may tap out two of the three phase waveforms and utilize only a single waveform of the three-phase power for producing the DC power signals. As will be appreciated, this is because single-phase operation is generally sufficient to derive the required control power without creating significant imbalance in a three-phase input.

The depicted input circuitry 190 may include one or more components 192 for reducing electromagnetic interference (EMI) in the input power signal 40. For instance, the components 192 may include filtering circuitry configured to reduce EMI in the input power signal. Thus, the input circuitry provides the EMI-reduced input signal, referred to here by reference number 194, to a rectifier 196. As shown, the rectifier 196 may be configured to rectify the signal 194 to a DC link signal 198. In yet another embodiment, the power supply unit 46 may also be configured to accept DC inputs. In such an embodiment, the input circuitry 190 may be configured to detect whether the input signal 40 is an AC or DC input and, if the signal 40 is a DC input, the input circuitry 190 route the signal 40 such that it bypasses the rectifier 196. By way of example, instead of being rectified, a DC input signal 40 may be converted into the DC link signal 198 by a DC-to-DC converter or some other suitable circuitry.

The DC link signal 198 may be initially provided to a bootstrap circuit 200. As will be appreciated, when the power supply unit 46 is initially powered on, the bootstrap circuit 200 may be configured to directly power the power supply unit 46 from the input voltage of the signal 40 for a short time. This allows the control circuitry 202 and the gate drive circuitry 206 to initiate and start up. As shown, the control circuitry 202 includes a pulse width modulation (PWM) controller 204 that drives the gate drive circuitry 206. In one embodiment, the gate drive circuitry 206 may include a high voltage power MOSFET, which may be controlled using drive signals from the PWM controller 204 to produce a pulsed or switched signal.

In one embodiment, the duty cycle of the pulsed signal produced by the gate drive circuitry 206 is regulated by a variable PWM controller 204 that is configured to decrease its switching frequency depending on the load, thereby offering low no-load power consumption and remaining efficient for other load conditions. For instance, in a no load condition, the switching frequency may be at a minimum. In one implementation, the PWM controller 204 may utilize a fixed peak current switching technique such that as the switching frequency decreases, the peak current is gradually reduced. By way of example, the peak current may be reduced down to between approximately 20 to 40 percent of the maximum peak current. This not only ensures power efficient operation, but may also prevent transformer mechanical resonance and/or acoustic noise.

The DC link signal 198 is also provide to a snubber 210. The snubber 210 may be configured to modulate current so as to prevent sharp or sudden rises in voltage (e.g., if current flow is suddenly interrupted), thus preventing possible damage to the circuitry of the power supply unit 46. The output 214 of the snubber circuitry 210 and the output 216 of the gate drive circuitry 206 are then provided to a transformer 212. As shown, a primary winding of the transformer 212 receives signals 214 and 216, and a secondary winding of the transformer 212 produces the output signals 222 and 224, respectively. A diode half bridge 226 receives the signal 222 and produces a first DC power signal 218, which may be filtered by the filtering circuit 228 prior to being output from the power supply unit 46. Similarly, a diode 230 receives the signal 224 and produces a second DC power signal 220, which may be filtered by the filtering circuit 232 prior to being output from the power supply unit 46. The filtering circuits 228 and 232 may reduce current ripple and/or voltage ripple in their respective DC signals 218 and 220.

As discussed above, each of the DC power signals 218 and 220 (collectively constituting the signals 48 of FIG. 4) may be utilized for powering or driving different components of the GPU 14. In the present embodiment, the DC signal 218 may be load independent and the DC signal 220 may be load dependent. That is, the load independent DC signal 218 may drive a component of the GPU 14 whose operational parameters are generally independent of the load coupled to the GPU 14, such as control logic 50 of the GPU 14. The load dependent DC signal 220 may drive a component of the GPU 14 whose operational parameters vary with or depend upon the load, such as the switching of the converter 56. Thus, in one embodiment, the DC signal 220 may be utilized to provide the drive signals 58 (FIG. 4) for controlling the switching pattern of the IGBTs 136, 138, 140, and 142 of the converter 56. By way of example only, in one embodiment, the DC signal 218 may be approximately 24 $V_{DC}$ (±1%) for powering the control logic 50, and the DC signal 220 may be approximately 15 $V_{DC}$ (±5%) for driving the switches of the converter 56, both having a tolerance of approximately 5 percent.

Further, in the depicted embodiment, the control circuitry 202 may receive one or more feedback signals 238 provided by feedback logic 208. The feedback logic 208 may provide current and/or voltage feedback to the control circuitry 202, thus enabling the control circuitry 202 to maintain the desired levels of the DC output signals 218 and 220 by modulating the switching frequency of the PWM controller 204. Additionally, since maintaining the DC output signal 220 at the desired output voltage level may be more challenging due to the load dependent nature of the signal 220, a voltage regulator 234 is provided in the output path downstream from the filter 232, such that the desired voltage level of the DC signal 220 may be maintained.

FIGS. 7A and 7B shows a circuit schematic that depicts certain functional components of the power supply unit 46 illustrated in FIG. 6 in more detail. For instance, as shown, the input circuitry 190 receives the input power signal 40 and may include the capacitors 240 and 242 and the inductors 244 and 246 arranged a common mode inductor. The capacitors 240 and 242 and the inductors 244 and 246 may collectively constitute the EMI filtering circuitry 192 for reducing electromagnetic interference in the input power signal 40, as shown in FIG. 6. In one embodiment, the capacitors 244 and 246 may have capacitances of between approximately 2000 to 6000 picofarads (e.g., approximately 4700 pF) and the inductors may have inductance values of between approximately 2 to 5 millihenries (e.g., approximately 3.4 mH).

The output of the input circuitry 190 (e.g., EMI-reduced power signal 194) is then provided to the rectifier 196 which includes the diodes 250, 252, 254, and 256, the capacitors 258, 260, 262, and 272, and the resistors 264, 266, and 268, arranged as illustrated in FIG. 7A. In one embodiment, the capacitors 258, 260, and 262 may each have a capacitance of approximately 470 µF, the capacitor 272 may have a capacitance of approximately 0.47 µF, and the resistors 264, 266, and 268 may have resistances of approximately 330 kiloohms. In certain embodiments, the capacitor 272 may function as a high frequency filter. Additionally, the rectifier 196 may include a thermally sensitive resistor 270 that is configured to provide current limiting functions, thus preventing sudden spikes in the current level when power is first applied. By way of example only, the resistor 270 may be a negative temperature coefficient (NTC) resistor or thermistor.

The control circuitry 202 includes the PWM controller 204, the diodes 288 and 290, capacitors 292 and 316, and resistors 310, 312, 314, and 318. In the depicted embodiment, the PWM controller 204 may be based upon a microcontroller and may have multiple input/output pins, depicted here by reference numbers 294, 296, 298, 300, 302, 304, and 306. The input 294 may represent a feedback input that receives the feedback signal 238a from the feedback logic 208. For instance, the feedback signal 238a may be a current feedback signal and, depending on the value of the current feedback, the switching frequency of the PWM controller 202 may be adjusted accordingly. The input 296 may represent an oscillator frequency input, and may define a maximum switching frequency when then feedback current 238a is zero based upon the capacitor 316. Further, the input 298 may be configured as a current sensing input. For instance, in one embodiment, the resistors 310, 312, and 314 may collectively be configured to sense when a maximum tolerable current threshold is exceeded and may shut off the power supply unit 46 when such a condition occurs in order to prevent damage to the power supply unit 46. Next, the input 300 may be a reference input connected to a common ground. Additionally, the input 302 of the PWM controller 204 may function as a latchoff input, the output 304 may function as an output for the drive signals provided by the PWM controller 204 to the gate driving circuitry 206, and the input 306 may be a supply voltage input (VCC). As shown, the supply voltage input 306 is coupled to the output of the bootstrap circuit 200, which includes the resistors 278, 280, and 282. Thus, the during initial startup phase of the power supply unit 46, the bootstrap circuit 200 may provide the initial power to the control circuitry 202. By way of example only, the pulse width modulation (PWM) controller 204, in one embodiment, may be provided as Model No. NCP1351, available from On Semiconductor Corporation of Phoenix, Ariz.

The gate drive circuitry 206, as shown in the depicted embodiment, includes the diodes 322 and 324, the bipolar junction transistors (BJTs) 326 and 328, the resistors 330, 332, and 334, and the power MOSFET 336. As shown, the drive signals, referred to here by reference number 320, are provided to the gate of the power MOSFET 336 and the emitters of the BJTs 326 and 328. Thus, based upon the switching frequency exhibited by the drive signal 320 provided by the PWM controller 204, the power MOSFET 336 may output a switched DC signal from its drain terminal. In one embodiment, the power MOSFET 336 may have a $V_{DSS}$ rating of between 800 to 2000 volts (e.g., 1500 volts) and a maximum $I_{DSS}$ rating of between approximately 10 to 500 µA. By way of example only, the power MOSFET 336, in one embodiment, may be provided as Model No. STW9N150, available from STMicroelectronics NV of Geneva, Switzerland. The outputs of the gate driving circuitry 206 are coupled to the primary winding 212a of the transformer 212. In the illustrated embodiment, the output of the snubber circuit 210, which includes resistors 342 and 344, capacitor 346, and diode 348, is also coupled to the primary winding 212a.

Referring to FIG. 7B, the secondary winding 212b of the transformer 212 produces the output signal 222, which is then rectified by the diode half bridge 226 and filtered by the filtering circuit 228 to produce the DC output signal 218. As shown, the diode half bridge 226 may include the diodes 350 and 352 arranged in a parallel configuration. Additionally, the resistor 354 and capacitor 356, which are coupled to the diode half bridge 226 may function as a snubber circuit. Further, in the depicted embodiment, the filtering circuitry 228 includes the capacitors 360, 362, 366, and 368, and the inductor 364, arranged as shown in FIG. 7B. The output of the filtering circuitry 228 produces the DC output signal 218 which, as discussed above, may be a load independent signal utilized for powering the control logic 50 of the GPU 14 in one embodiment.

The secondary winding 212b also provides the signal 224 to the diode 230. The output of the diode 230 is filtered by the filtering circuit 232 to produce the DC output signal 220. In the depicted embodiment, a resistor 372 and capacitor 374 are coupled to the diode 230 and may function as a snubber circuit. Further, the filtering circuitry 232 includes the capacitors 380, 384, and 386, and the inductor 382, arranged as shown in FIG. 7B. The output of the filtering circuitry 228 produces the DC output signal 220 which, as discussed above, may be a load dependent signal utilized for providing drive signals for controlling the IGBT switches of the converter 56 of the GPU 14. Because the load dependent signal 220 is more difficult to maintain at a desired level, the voltage regulator 234 is provided in the present embodiment in the output path downstream from the filter 232. Finally, as shown in FIG. 7B, the feedback logic 208 may include the resistors 390, 392, and 396, the capacitor 394, a voltage reference 398, and an optocoupler 400. The optocoupler 400 provides the feedback voltage and/or current signals 238 which, as discussed above, may be utilized by the PWM controller 202 to modulate the duty cycle of the switched DC output of the gate drive circuitry 206 in order to achieve the desired DC output signals 218 and 220.

Embodiments of the GPU disclosed herein offer several technical advantages over conventional GPUs. For instance, the arrangement of components within the disclosed GPU 14 provides that the AC input signal is converted to a DC link signal and then to a switched DC signal prior to being transformed. This allows for the use of a single-phase transformer (e.g., transformer 62), which provides for reduced cost and overall equipment size compared to conventional GPUs, which commonly use bulky multi-phase transformers for transforming the AC input signal directly. In other words, one difference between the presently disclosed GPU 14 and certain conventional GPUs is that a transforming element is located downstream of a rectifier that receives the AC input.

Further, as discussed above, the GPU 14 utilizes a DC-to-DC converter 56 that operates at a high frequency of between approximately 10-20 kilohertz. This allows for the GPU 14 to accept 400 hertz AC input signals directly due to the controller being able to modulate the duty cycle as needed (e.g., "on the fly") according to the input frequency. In certain embodiments, input frequencies of between 10 hertz to 1000 hertz (1 kilohertz) may be accepted by the GPU 14. In contrast, conventional GPUs commonly accept only 50 or 60 hertz signals. Moreover, the DC-to-DC converter 56 is self-controlled in the sense that the duty cycle of the converter may be modulated independently of the AC input signal. Additionally, the DC-to-DC converter 56 utilizes zero volt switching, such that the pulse width of the switched DC output is modulated only when needed by the output load. Further, because the power supply unit 46 of the disclosed GPU is capable of accepting a similar wide range of AC inputs, the GPU 14 may be used with various power standards without having to change or reconfigure input transformer taps.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power supply unit comprising:
an input circuit configured to receive an AC input signal;
a rectifier configured to convert the AC input signal to a DC link signal;
a variable pulse width modulation (PWM) controller configured to supply a drive signal based upon a switching frequency;
a drive circuit comprising a power transistor configured to produce a switched DC signal from the DC link signal under the control of the drive signal;
a transformer comprising a primary winding and a secondary winding, wherein the transformer is configured to receive the switched DC signal on the primary winding and to produce a first transformer output signal and a second transformer output signal on the secondary winding;
a diode half bridge configured to receive the first transformer output signal and to produce a first DC output signal; and
a diode configured to receive the second transformer output signal and to produce a second DC output signal;
wherein the first DC output signal is utilized for powering control logic for a ground power unit (GPU), and wherein the second DC output signal is utilized for driving a power converter of the GPU.

2. The power supply unit of claim 1, wherein the first DC output signal is load independent and wherein the second DC output signal is load dependent with respect to a load coupled to the GPU.

3. The power supply unit of claim 1, wherein the input circuit comprises electromagnetic filtering circuitry configured to reduce electromagnetic interference in the AC input signal.

4. The power supply unit of claim 1, wherein the power transistor comprises a power MOSFET transistor.

5. The power supply unit of claim 4, wherein the power MOSFET transistor has a drain-to-source voltage ($V_{Dss}$) rating of at least 1000 volts.

6. The power supply unit of claim 1, wherein the variable PWM controller is configured to vary the switching frequency proportionally with respect to a load.

7. The power supply unit of claim 6, wherein the variable PWM controller is configured to reduce a peak current of the drive signal as the switching frequency decreases.

8. The power supply unit of claim 1, wherein the AC input signal is between approximately 200 to 600 volts.

9. The power supply unit of claim 1, wherein a line frequency of the AC input signal is 50 hertz, 60 hertz, or 400 hertz.

10. The power supply unit of claim 1, wherein the rectifier comprises a current limiting resistor.

11. A power system, comprising:
a power source configured to provide an AC input signal; and
a ground power unit (GPU) configured to convert the AC input signal into a DC output signal for powering a load, wherein the ground power unit comprises:
a rectifier configured to convert the AC input signal into a first DC link signal;
a DC-to-DC converter comprising a plurality of switches and configured to receive the first DC link signal and to output a switched DC signal;
a transformer configured to receive the switched DC signal on a primary winding and to output the switched DC signal from the secondary winding;
at least one diode bridge configured to rectify the switched DC signal from the transformer to produce a DC output signal; and
a power supply unit configured to rectify the AC input signal to produce a second DC link signal, to produce a switched DC signal based upon the second DC link signal using a power MOSFET controlled by a pulse width modulation (PWM) controller having a switching frequency that varies proportionately with respect to the load, and to produce a load independent DC output signal and a load dependent DC output signal based upon the switched DC signal;
wherein the load dependent DC output signal is used to control the plurality of switches.

12. The power system of claim 11, wherein the GPU comprises control logic configured to provide control signals to the plurality of switches of the DC-to-DC converter based upon the load dependent DC output signal.

13. The power system of claim 12, wherein the plurality of switches comprises first, second, third, and fourth insulated gate bipolar transistors (IGBTs) configured in an H-bridge arrangement, and wherein the first and fourth IGBTs and the second and third IGBTs are switched using the load dependent DC output signal in an alternating manner to control the duty cycle of the DC-to-DC converter.

14. The power system of claim 12, wherein the load independent DC output signal is used to power the control logic.

15. The power system of claim 12, wherein the control logic comprises a controller area network (CAN) interface.

16. The power system of claim 11, wherein the power source comprises at least one of a power grid or an engine-generator unit.

17. The power system of claim 11, wherein the load comprises a grounded aircraft.

18. A method for powering a ground power unit comprising:
  receiving an AC input signal;
  rectifying the AC input signal to produce a DC link signal;
  using the DC link signal, producing a switched DC signal using a power MOSFET under the control of a variable pulse width modulation (PWM) controller configured to supply a drive signal to a gate of the power MOSFET, wherein the variable PWM controller is configured to vary its switching frequency proportionately with a load coupled to the ground power unit;
  transforming the switched DC signal using a transformer to produce a first transformer output signal and a second transformer output signal;
  using a diode half bridge to convert the first transformer output signal to a first DC output signal that is load independent;
  using a diode to convert the second transformer output signal to a second DC output signal that is load dependent;
  using the first DC output signal to power a control interface of the ground power unit; and
  using the second DC output signal to drive a plurality of semiconductor switches of the ground power unit.

19. The method of claim 18, wherein the first DC output signal is approximately 24 $V_{DC}$.

20. The method of claim 18, wherein the second DC output signal is approximately 15 $V_{DC}$.

21. The method of claim 18, comprising filtering at least one of the first or second DC output signals using filtering circuitry to reduce at least one of current ripple or voltage ripple.

22. The method of claim 18, comprising using feedback circuitry to provide at least one of current or voltage feedback to the variable PWM controller.

23. The method of claim 22, wherein the feedback circuitry comprises an optocoupler.

* * * * *